(12) United States Patent
Tatewaki et al.

(10) Patent No.: US 6,938,723 B2
(45) Date of Patent: Sep. 6, 2005

(54) ELECTRIC POWER STEERING APPARATUS

(75) Inventors: Osamu Tatewaki, Gunma-ken (JP); Hiroshi Eda, Gunma-ken (JP); Toshihiro Fukuda, Gunma-ken (JP); Jun Okada, Gunma-ken (JP)

(73) Assignee: NSK Ltd., Tokyo (JP)

( * ) Notice: Subject to any disclaimer, the term of this patent is extended or adjusted under 35 U.S.C. 154(b) by 3 days.

(21) Appl. No.: 10/767,613

(22) Filed: Jan. 30, 2004

(65) Prior Publication Data

US 2004/0182638 A1 Sep. 23, 2004

Related U.S. Application Data

(62) Division of application No. 10/178,707, filed on Jun. 25, 2002, now Pat. No. 6,702,060.

(30) Foreign Application Priority Data

| Jun. 27, 2001 | (JP) | 2001-194837 |
| Feb. 8, 2002 | (JP) | 2002-032774 |
| Mar. 11, 2002 | (JP) | 2002-065602 |

(51) Int. Cl.[7] .............................................. B62D 5/04
(52) U.S. Cl. ....................................................... 180/444
(58) Field of Search ................................. 180/443, 444

(56) References Cited

U.S. PATENT DOCUMENTS

| 4,000,664 A | 1/1977 | Christensen ............... 74/89.44 |
| 4,754,829 A | 7/1988 | Shimizu ..................... 180/79.1 |
| 4,837,692 A | 6/1989 | Shimizu ...................... 364/424 |
| 5,083,626 A | 1/1992 | Abe et al. ................... 180/79.1 |
| 5,648,103 A | 7/1997 | Takanohashi ............... 425/107 |
| 6,026,924 A | 2/2000 | Godek ......................... 180/444 |
| 6,082,483 A | 7/2000 | Taniguchi et al. .......... 180/444 |
| 2002/0148673 A1 * | 10/2002 | Menjak et al. .............. 180/444 |
| 2003/0019686 A1 | 1/2003 | Fukuda et al. .............. 180/444 |

FOREIGN PATENT DOCUMENTS

| EP | 0 930 214 | 7/1999 |
| EP | 0 967 133 | 12/1999 |
| GB | 2 198 098 | 6/1988 |
| JP | UM 62-127868 | 8/1987 |
| JP | UM 63-12471 | 1/1988 |
| JP | 2-46455 | 12/1990 |
| JP | 3-15591 | 3/1991 |
| JP | 4-28583 | 5/1992 |
| JP | 5-14939 | 4/1993 |
| JP | 5-262243 | 10/1993 |
| JP | 6-504 | 1/1994 |
| JP | 6-49489 | 12/1994 |
| JP | 8-207797 | 8/1996 |
| JP | 11-198822 | 7/1999 |
| JP | 3062852 | 5/2000 |
| JP | 2001-097232 | 4/2001 |

* cited by examiner

Primary Examiner—Kevin Hurley
(74) Attorney, Agent, or Firm—Miles & Stockbridge P.C.

(57) ABSTRACT

An electric power steering apparatus comprises a ball nut rotationally driven by an electric motor through a gear train and having a female thread groove formed in the inner periphery thereof, a rack shaft disposed through the ball nut on the axis thereof and having a male thread groove so formed in its outer periphery as to face to the female thread groove, a ball screw mechanism having a number of circulation balls interposed between the female thread groove and the male thread groove, and a housing for holding the ball nut rotatably through the bearing. An elastic member is interposed between the housing and the ball nut in order to permit the ball nut to make a predetermined displacement.

15 Claims, 12 Drawing Sheets

ELECTRIC POWER STEERING APPARATUS

CROSS-REFERENCE TO RELATED APPLICATION

This application is a division of application Ser. No. 10/178,707 filed Jun. 25, 2002 now U.S. Pat. No. 6,702,060.

This application claims the benefit of Japanese Patent Application No. 2000-194837, No. 2002-032774 and No. 2002-065602 which are hereby incorporated by reference.

BACKGROUND OF THE INVENTION

1. Field of the Invention

The present invention relates to a ball screw rack assist type electric power steering apparatus.

2. Related Background Art

Steering systems of automobiles widely use a so-called power steering apparatus for assisting a steering operation by use of an external power source. the power source for the power steering apparatus has hitherto involved the use of a hydraulic pump, and this hydraulic pump is driven by the engine in many cases. This type of power steering apparatus has, however, a large power loss (on the order of several through ten horsepower (HP) at a maximum load) of the engine because of driving the hydraulic pump at all times and is therefore hard to apply to mini-sized motor vehicles exhibiting small displacements. Even the automobiles having comparatively large displacements, when installed, come to have such an inevitable demerit that their running fuel economy becomes low enough not to be negligible.

Such being the case, an electric power steering (which will hereinafter be abbreviated to EPS) involving the use of an electric motor as a power source has attracted the attention over the recent years for obviating those problems. The EPS apparatus exhibits characteristics, wherein there is no direct drive loss of the engine because of using a battery loaded into the car as a power source for the electric motor, a decrease in the running fuel economy is restrained as the electric motor is started only when assisting the steering operation, and in addition the precise electronic control can be extremely easily performed.

On the other hand, for a steering gear mechanism for a passenger car, a rack-and-pinion steering gear is mainly employed at the present, since the rack-and-pinion gear has high rigidity performance and low in weight. Then, the EPS apparatuses for the rack-and-pinion steering gear include a column assist type in which the electric motor is arranged sideways of the column in order to drive a steering shaft and a pinion itself, and in addition a ball screw rack assist type in which a rack shaft is driven by an electrically-driven ball screw mechanism. In the ball screw rack assist type EPS apparatus (which will hereinafter be simply called the rack assist type EPS apparatus), the assist force does not act on a meshing surface between the pinion and the rack, and therefore a contact surface pressure between these two members, which is to be a factor for abrasion and deformation as well, is relatively small.

According to the rack assist type EPS apparatus, a ball screw shaft male thread groove formed in a rack shaft engages with a female thread groove formed in a ball nut through a multiplicity of circulation balls (steel balls), and the ball nut is rotated by the electric motor, thereby moving the rack shaft in the axial directions. A power transmission method for transmitting the power from the electric motor to the ball nut may be a timing belt system disclosed in Japanese Utility Model Publication No. 6-49489 etc, however, a general method is a gear system disclosed in Japanese Utility Model Publication Nos. 5-14939 (a first prior art) and 2-46455 (a second prior art) etc. In case of the conventional rack assist type EPS apparatus, if low of an assembly accuracy of the respective parts constituting the ball screw mechanism and the rack and pinion mechanism, a misalignment occurs between the ball nut and the rack and pinion pair. In this case, so-called distortions are formed between the ball nut and the rack shaft, with the result that a smooth movement of the rack shaft is hindered. This hindrance of the smooth movement might cause a loss of driving force, an abnormal abrasion and, besides, noises when operated. Further, if the working accuracy and the assembly accuracy of the housings that accommodate and hold the ball screw mechanism and the electric motor, are low, a backlash occurs between the gear pair connecting the ball nut and the electric motor together, and the noises are likewise emitted.

Such being the case, each of the rack assist type EPS apparatuses according to the first and second prior arts adopts an aligning mechanism for supporting the ball nut so as to be swayable about the housing through a spherical bearing in order to obviate a misalignment between the ball nut and the rack shaft. Large increases in the number of manufacturing processes and in the costs for the product are, however, inevitable for providing the spherical bearing between the housing and the ball nut. Moreover, the spherical bearing utilizes the slide on between the metal members, and hence, if a comparatively large load acts, a predetermined aligning operation is not obtained due to a rise in slide friction force, with the result that the misalignment is not obviated in the great majority of cases. Further, if the ball nut is supported on the spherical bearing, a central position of the ball nut remained unchanged, so that the backlash between the gears is not, as a matter of course, canceled.

Generally the ball nut configuring the ball screw mechanism is structured so that a rolling bearing (a double-row angular ball bearing etc) is fitted on and made integral with the ball nut body. The ball nut is fixed by a ring bolt or a C-shaped stopper ring brought into contact with an outer ring of the rolling bearing within the housing.

In the conventional rack assist type EPS apparatus, the C-shaped stopper ring comes off and falls out of an engagement groove formed in the housing, or the ring bolt slackens and falls out due to a careless operation in the assembly and vibrations when driving. In this case, since the ball nut moves in an axial direction by dint of an external force, a proper axial force can not be given to the rack shaft. This results in an extremely unagreeable feeling of the steering and in an impossibility of performing the precise steering.

According to the rack assist type EPS apparatus adopting the gear type power transmission method, an idle gear is interposed between the gear on the electric motor and the gear on the ball nut in order to avoid an increase in diameter of each of these two gears.

In the rack assist type EPS apparatus, the gear train for the power transmission, the ball screw mechanism and the bearing for supporting the ball nut, have hitherto been lubricated by respective lubricants (normally greases) for exclusive uses therefor. Hence, in this type of EPS apparatus, three or four pieces of shaft seals are attached to side portions etc of the gear portion of the ball nut, thereby preventing the lubricants from being mixed. If many shaft seals are thus used, a large friction loss occurs when the ball nut rotates, there are caused a loss of driving torque and an unagreeable feeling of the steering. Further, the steering gear case and the ball nut need high-precision working of seal seats and seal slide surfaces in order to accommodate and hold the shaft seals. This is a factor for increasing the costs for the product along with the rise in the number of components.

SUMMARY OF THE INVENTION

It is an object of the first invention of the present application to provide a rack assist type electric power steering apparatus capable of improving an operability and canceling a backlash etc in a gear train of a driving system.

To accomplish the object given above, according to the first invention, an electric power steering apparatus comprises a ball nut rotationally driven by an electric motor through a gear train and having a female thread groove formed in the inner periphery thereof, a rack shaft disposed through said ball nut on the axis thereof and having a male thread groove so formed in its outer periphery as to face to the female thread groove of the ball nut, a ball screw mechanism having a number of circulation balls interposed between the female thread groove and the male thread groove, and a housing for holding the ball nut rotatably through the bearing, wherein elastic members are interposed between the housing and the ball nut in order to permit the ball nut to make a predetermined displacement.

According to the first invention, even if a misalignment occurs between the ball nut and the rack and pinion pair, the ball nut displaces with a deformation of the elastic member, thereby obviating the misalignment. Further, a backlash between the gears due to a defect in working of the housing and so on, is also canceled by biasing the ball nut in a direction right-angled to the axis with the elastic member.

It is an object of the second invention of the present application to provide an electric power steering apparatus capable of preventing a fall-out of a fastening element for fixing the ball nut and thus preventing a decline of a steerability.

To accomplish this object, according to the second invention, an electric power steering apparatus comprises a ball nut rotationally driven by an electric motor and having a female thread groove formed in the inner periphery thereof, a rack shaft disposed through the ball nut on the axis thereof and having a male thread groove so formed in its outer periphery as to face to the female thread groove, a number of circulation balls interposed between the female thread groove and the male thread groove, a housing for holding the ball nut rotatably, and a fastening element for fixing the nut to the housing, wherein the electric power steering apparatus is provided with a fall-out preventing mechanism for preventing the fastening element from falling out off within the housing.

According to the second invention, the fastening element does not come off the housing, and hence, even if the fastening element comes off and slackens, the ball nut does not move in excess of the predetermined range.

Further, in the electric power steering apparatus according to the second invention, the housing may be constructed of a first housing accommodating the ball nut and the fastening element and a second housing fixed to the first housing, and the fall-out preventing mechanism may be a fastening element contact member, formed on the second housing, for regulating the fastening element from moving in the fall-out direction. With this contrivance, the fall-out preventing mechanism is formed simply by fastening integrally the first housing and the second housing to each other.

Moreover, in the electric power steering apparatus according to the second invention, the fastening element may be a stopper ring fitted to the first housing, and an interval between the stopper ring and the fastening element contact member may be, in an assembled state, set smaller than a thickness of the stopper ring. This scheme prevents the stopper ring, even if on the verge of coming off due to a careless operation etc when assembled, from completely falling out because of coming into contact with the fastening element contact member.

In the electric power steering apparatus according to the second invention, the fastening element may be a ring bolt helically fitted to the first housing, and an interval between the ring bolt and the fastening element contact member may be, in an assembled state, set smaller than an effective helical-fitting length of the ring bolt to the first housing. With this contrivance, the ring bolt, even when slackening due to the vibrations etc during driving, comes into the contact with the fastening element contact member and is thereby prevented from completely falling out.

It is an object of the third invention of the present application to provide a rack assist type electric power steering apparatus capable of reducing a friction loss when operating and the number of components.

To accomplish the above object, according to the third invention, a rack assist type electric power steering apparatus comprises a ball nut rotationally driven by an electric motor, a ball screw mechanism interposed between the ball nut and a rack shaft, and a bearing for rotatably supporting the ball nut, wherein the ball screw mechanism and the bearing share a lubricant with each other.

Further, in the rack assist type electric power steering apparatus according to the third invention, it is preferable that a power transmission mechanism be interposed between the electric motor and the ball nut, and the power transmission mechanism, the ball screw mechanism and the bearing share the lubricant with each other.

In the rack assist type electric power steering apparatus according to the third invention, the power transmission mechanism may be a gear type power transmission mechanism or a chain type power transmission mechanism or a belt type power transmission mechanism or a friction roller type power transmission mechanism.

According to the third invention, there is no necessity for the shaft seal, whereby the friction loss caused by the rotations of the ball nut decreases, and the enhanced feeling of the steering is attained. Besides, the decreases in the number of working processes for the steering gear case etc and in the number of components, lead to the considerable reduction in the costs for the product.

DESCRIPTION OF THE PREFERRED EMBODIMENTS

Several embodiments of the first, second and third inventions will hereinafter be described with reference to the accompanying drawings.

Figure 1:
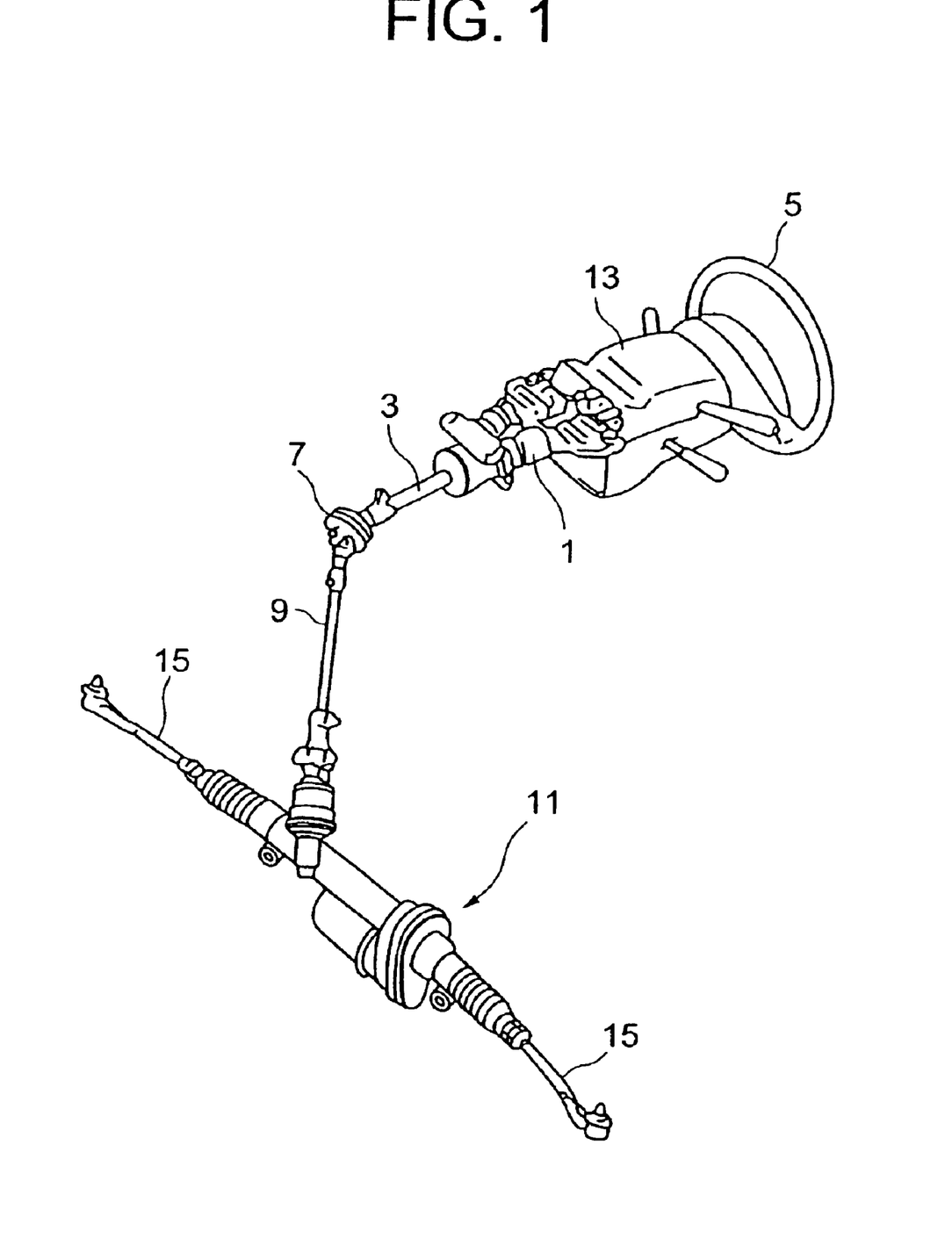
FIG. 1 is a perspective view showing an in-cabin portion of an electric power steering apparatus according to the first and second inventions.

FIG. 1 is a perspective view showing an in-cabin portion of an electric power steering apparatus in a first embodiment of the first invention. A member indicated by the numeral 1 in FIG. 1 is a steering column. The steering column 1 supports an upper steering shaft 3 rotatably. A steering wheel 5 is attached to an upper side end of the upper steering shaft 3. A lower steering shaft 9 is joined via a universal joint 7 to a lower side end of the shaft 3. Further, a steering gear mechanism 11 constructed of a rack-and-pinion mechanism, a power assist mechanism etc is connected to a lower side end of the lower steering shaft 9. Referring again to FIG. 1, the numeral 13 represents a column cover for covering the steering column 1, and the numeral 15 denotes tie rods connected to right and left ends of the steering gear mechanism 11.

Figure 2:
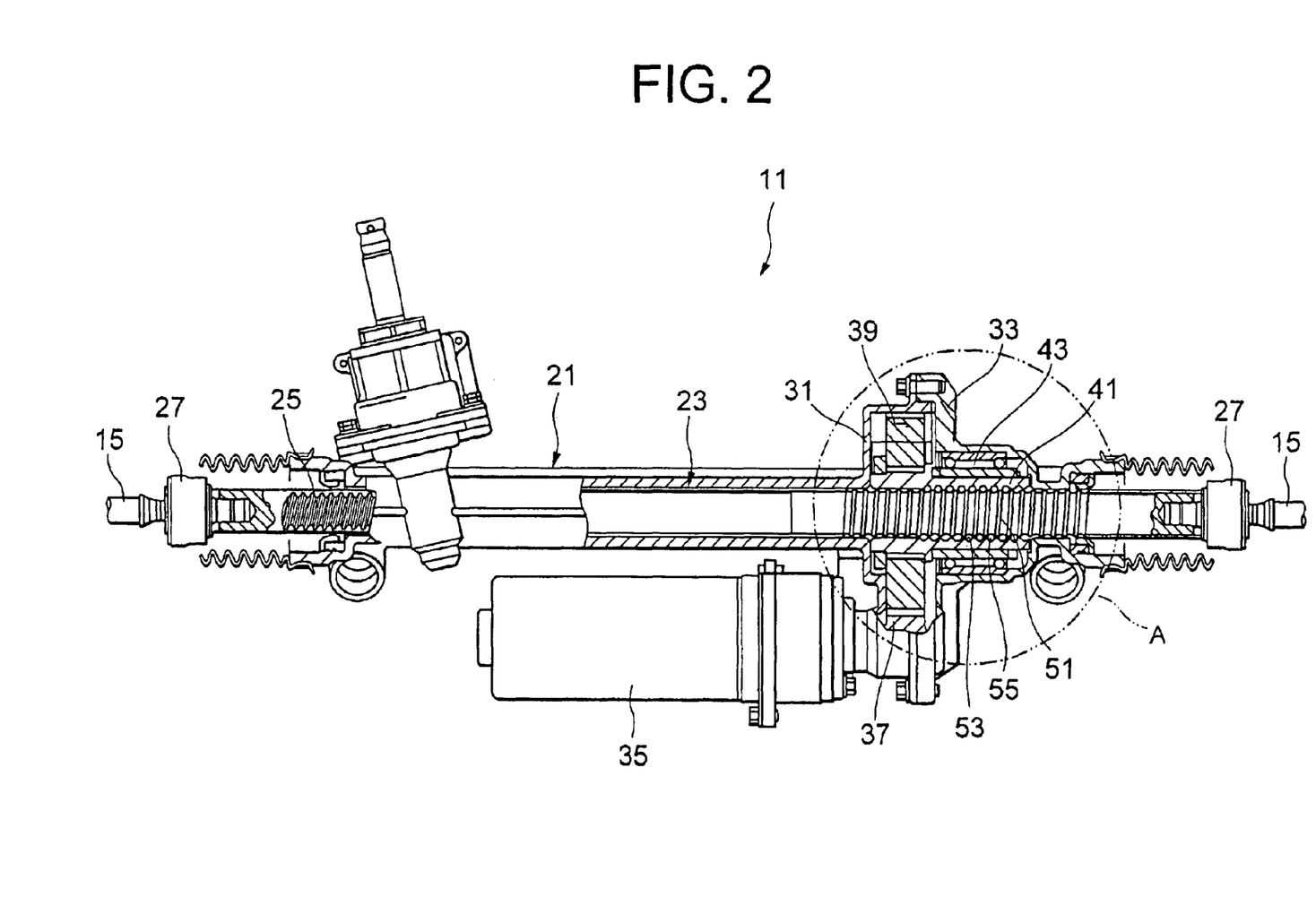
FIG. 2 is a vertical sectional view showing a steering gear in the first embodiment of the first invention.
Figure 3:
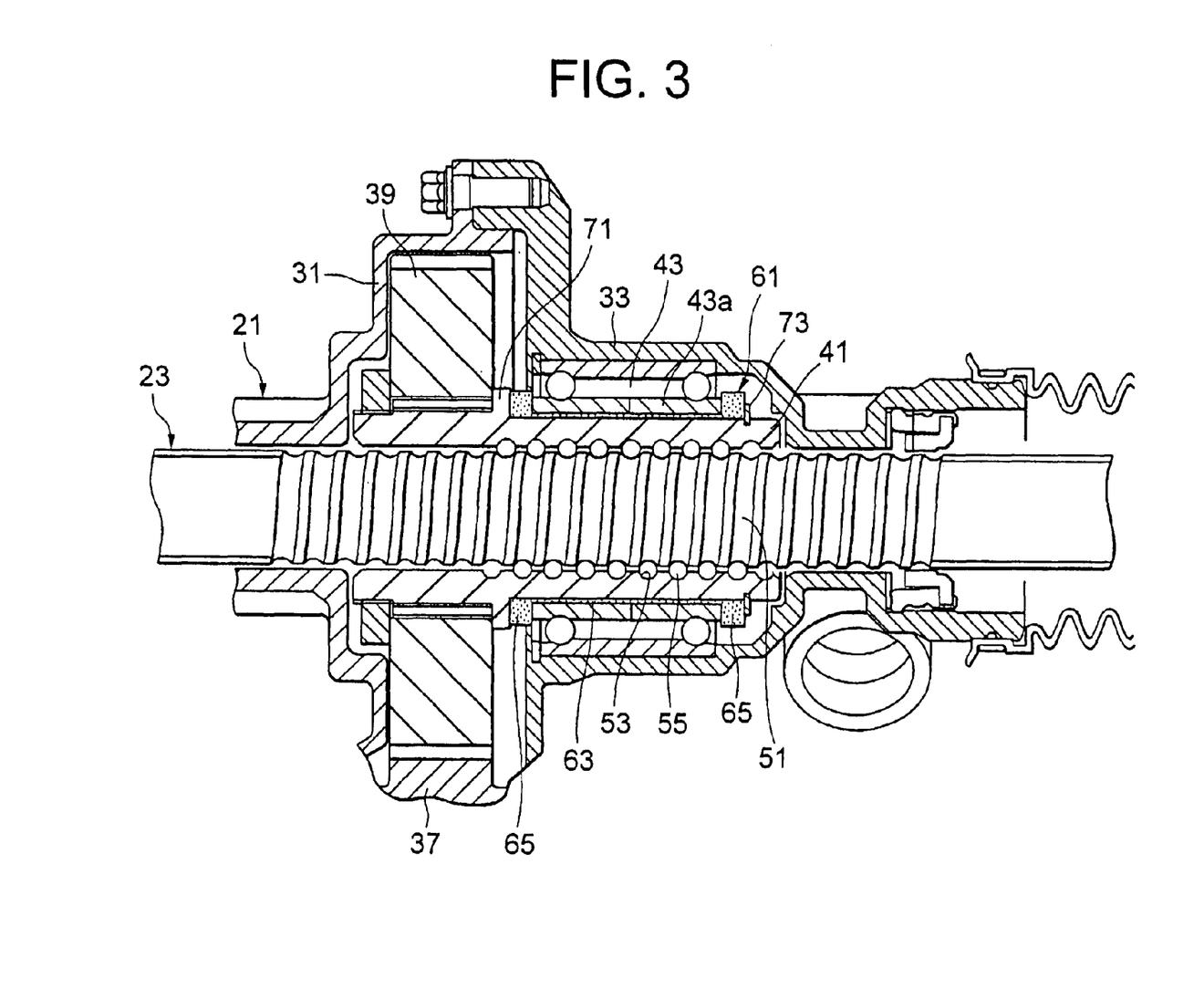
FIG. 3 is an enlarged sectional view of a portion A in FIG. 2.

FIG. 2 is a vertical sectional view showing principal components of the steering gear mechanism 11 in the first embodiment of the first invention. FIG. 3 is an enlarged view showing a portion A in FIG. 2. A member indicated by the numeral 21 in FIG. 2 is a rack-and-pinion housing configuring a steering gear case. The rack-and-pinion housing 21 accommodates a rack shaft 23 and a pinion (not shown) held therein, which constitute the rack-and-pinion mechanism. The rack shaft 23 has a rack 25 provided on the left side in FIG. 2 and meshing with the pinion. Spherical joints 27, 27 supporting the tie rods 15, 15 are fixed to the right and left ends of the rack shaft 23.

The power assist mechanism has its shell configured by a gear housing 31 formed at the right end, as viewed in FIG. 2, of the rack-and-pinion housing 21, and by a ball screw housing 33 constituting the steering gear case in cooperation with the rack-and-pinion housing 21 fastened by bolts to the gear housing 31. The gear housing 31, to which lower portion the front end of an electric motor 35 is fastened by bolts, accommodates a drive gear (a spur gear in this embodiment) 37 fixed to a motor shaft (unillustrated), and a driven gear (a spur gear in this embodiment) 39 meshing with the drive gear 37. Further, in the ball screw housing 33 a ball nut 41 whose outer periphery is spline-fitted in the driven gear 39, is rotatably held through a double-row angular ball bearing 43.

The rack shaft 23 is formed with a male thread groove 51, while the ball nut 41 is formed with a female thread groove 53, and a number of steel balls 55 defined as circulation balls are interposed between the male thread groove 51 and the female thread groove 53. Moreover, the ball nut 41 is fitted with circulation pieces (not shown) for assisting the circulation of the steel balls 55.

According to the first embodiment of the first invention, as illustrated in FIG. 3, an elastic bush 61 composed of an elastic member such as a synthetic rubber etc is interposed between the ball nut 41 and the bearing 43. The elastic bush 61 is formed with a cylindrical portion 63 on which an inner race 43a of the bearing 43 is fitted, and with flange members 65, 65 at both ends of the cylindrical portion 63. End surfaces of the inner race 43a are brought into contact with inner end surfaces of the two flange members 65, 65. An outer end surface of one flange member 65 comes into contact with a stepped portion 71 of the ball nut 41, while an outer end surface of the other flange member 65 is secured by a stopper ring 73.

An operation in the first embodiment of the first invention will hereinafter be described.

When a driver rotates the steering wheel 5, a rotational force thereof is transferred to the steering gear mechanism 11 via the upper steering shaft 3 and the lower steering shaft 9. The steering gear mechanism 11 has a built-in rack-and-pinion mechanism for converting the rotational input into a rectilinear motion. With this mechanism, the rack shaft 23 moves in any one of the right and left directions, and a steering angle of the wheels changes through the right and left tie rods 15, thus performing a steering operation. On this occasion, within the power assist mechanism, the electric motor 35, based on an output of an unillustrated steering torque sensor, rotates with a predetermined rotational torque in a forward or reversed direction, and the rotations thereof are decelerated and thus transferred to the ball nut 41 via the driven gear 39. Upon rotations of the ball nut 41, a thrust force acts on the male thread groove 51 of the rack shaft 23 through the steel balls 55 fitted in the female thread groove 53, thereby attaining a steering assist force.

According to the first embodiment of the first invention, the ball nut 41 is held by the bearing 43 through the elastic bush 61, and therefore, even if somewhat a misalignment occurs between the ball nut 41 and the rack shaft 23 due to lacks of working accuracy and assembling accuracy with respect to the parts, this misalignment is absorbed by a displacement of the ball nut 41, thereby restraining a loss of driving force and abnormal abrasions of the respective portions. Further, the ball nut 41 is so set as to be biased toward the electric motor 35 by the elastic bush 61. With this setting, even if a backlash occurs between the drive gear 37 and the driven gear 39, this backlash is absorbed, and no noises are emitted.

Figure 4:
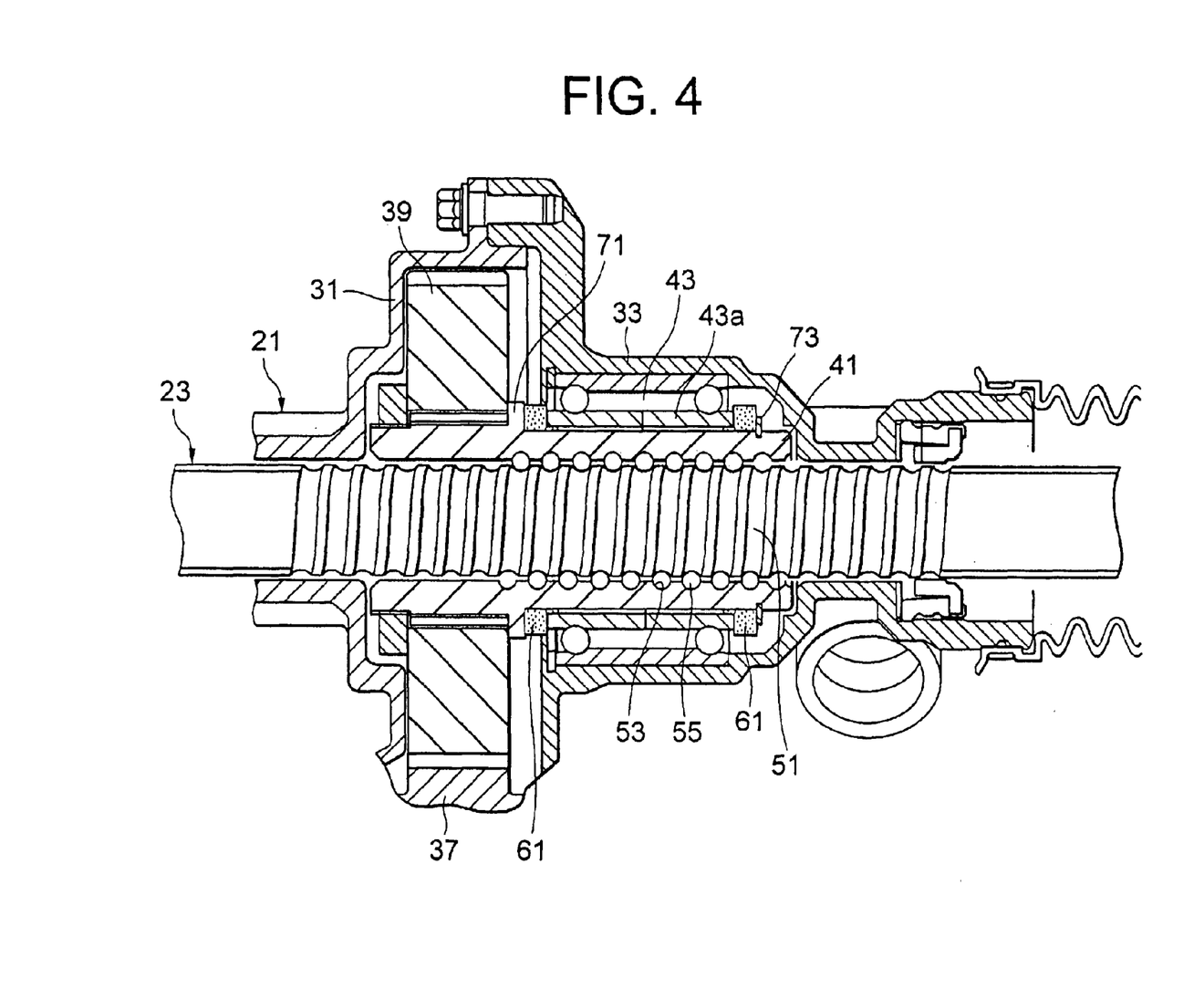
FIG. 4 is an enlarged sectional view showing the principal components of the steering gear in a second embodiment of the first invention.
Figure 5:
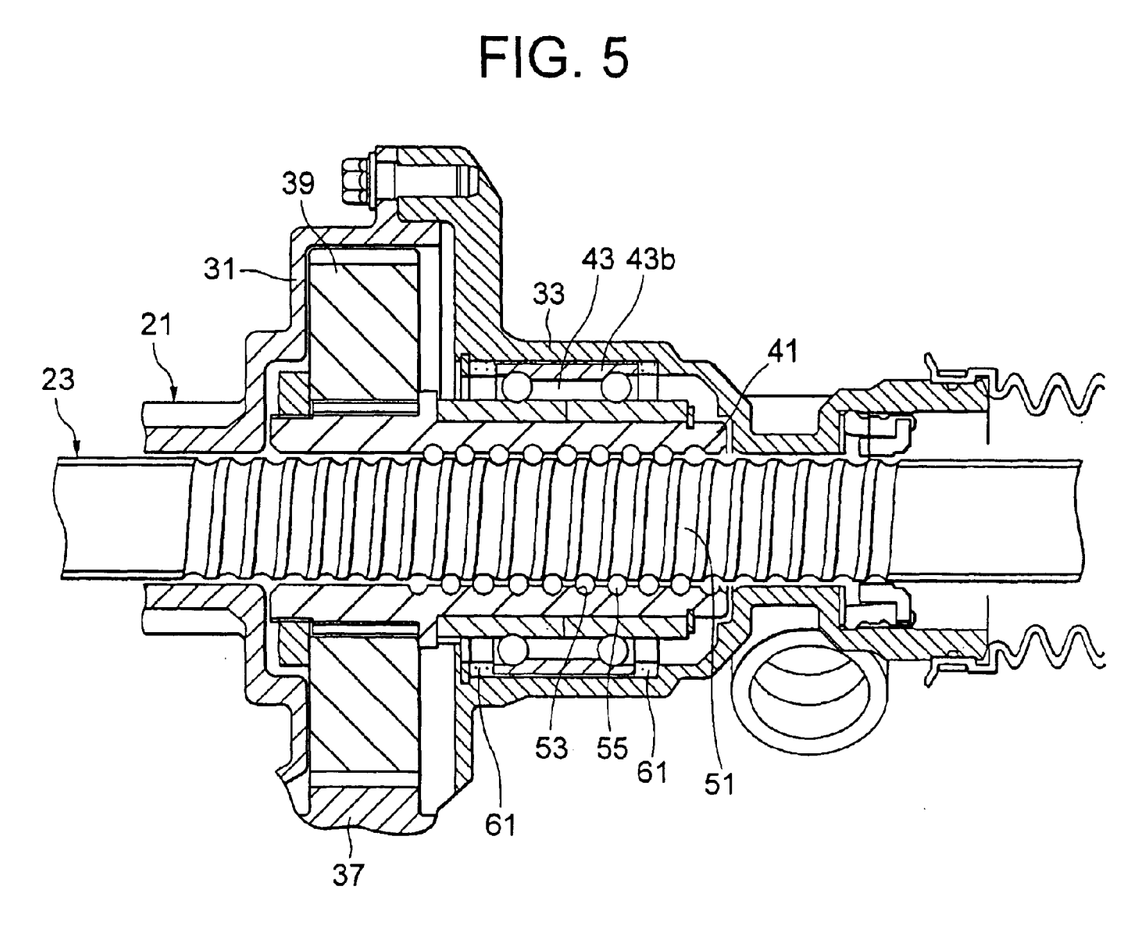
FIG. 5 is an enlarged sectional view showing the principal components of the steering gear in a third embodiment of the first invention.

FIG. 4 is an enlarged sectional view showing principal portions of the steering gear in a second embodiment of the first invention. FIG. 5 is an enlarged sectional view showing principal portions of the steering gear in a third embodiment of the first invention. Each of the second and third embodiments takes substantially the same whole structure as in the first embodiment discussed above, and their operations and effects are the same as those in the first embodiment, however, differences therebetween are a configuration of the elastic bush and a position where this bush is disposed. To be specific, according to the second embodiment, a couple of elastic bushes 61, 61 are interposed respectively between the ball nut 41 and both ends of the inner race 43a of the bearing 43, thus scheming to improve an assembly workability etc. Further, according to the third embodiment shown in FIG. 5, the couple of elastic bushes 61, 61 are interposed between a ball screw housing 33 and an outer race 43b of the bearing 43, whereby the ball nut 41 and the bearing 43 make integral displacements with respect to the ball screw housing 33.

The explanations of the specific embodiments of the first invention, which have been discussed so far, come to an end, however, the mode of the first invention is not limited to the embodiments discussed above. For instance, the electric motor and the ball nut are connected by use of the couple of spur gears and may also be connected by three or more gears including an idle gear or by a helical gear train. Further, the motor shaft of the electric motor and the central axis of the ball nut are not necessarily disposed in parallel, and it follows that they become orthogonal in the case of combining a worm wheel with a pinion and using a bevel gear etc. Moreover, the configurations, from the shape of the elastic member and the whole construction of the steering gear down to the structure of the power assist mechanism, are not confined to the exemplifications in the embodiments discussed above, and can be, if within the range that does not depart from the concept of the present first invention, properly changed based on requests in terms of designs and specifications.

As discussed above, the electric power steering apparatus according to the first invention includes the ball nut rotationally driven by the electric motor through the gear train and having a female thread groove formed in the inner periphery thereof, the rack shaft disposed through the ball nut on the axis thereof and having a male thread groove so formed in its outer periphery as to face to the female thread groove, the ball screw mechanism having the plurality of circulation balls interposed between the female thread groove and the male thread groove, and the housing for holding the ball nut rotatably through the bearing. In the thus constructed electric power steering apparatus, the elastic members are interposed between the housing and the ball nut in order to permit the ball nut to make the predetermined displacement. Therefore, even if the misalignment occurs between the ball nut and the rack shaft, the ball nut displaces owing to deformations of the elastic members, thereby canceling this misalignment. In addition, the backlash caused between the gears due to a defect in working of the housing etc is also obviated by biasing the ball nut in the direction right-angled to the axial direction with the elastic members.

An outline of a configuration of the electric power steering apparatus in a first embodiment of the second invention is illustrated in FIG. 1 as in the first invention.

Figure 6:
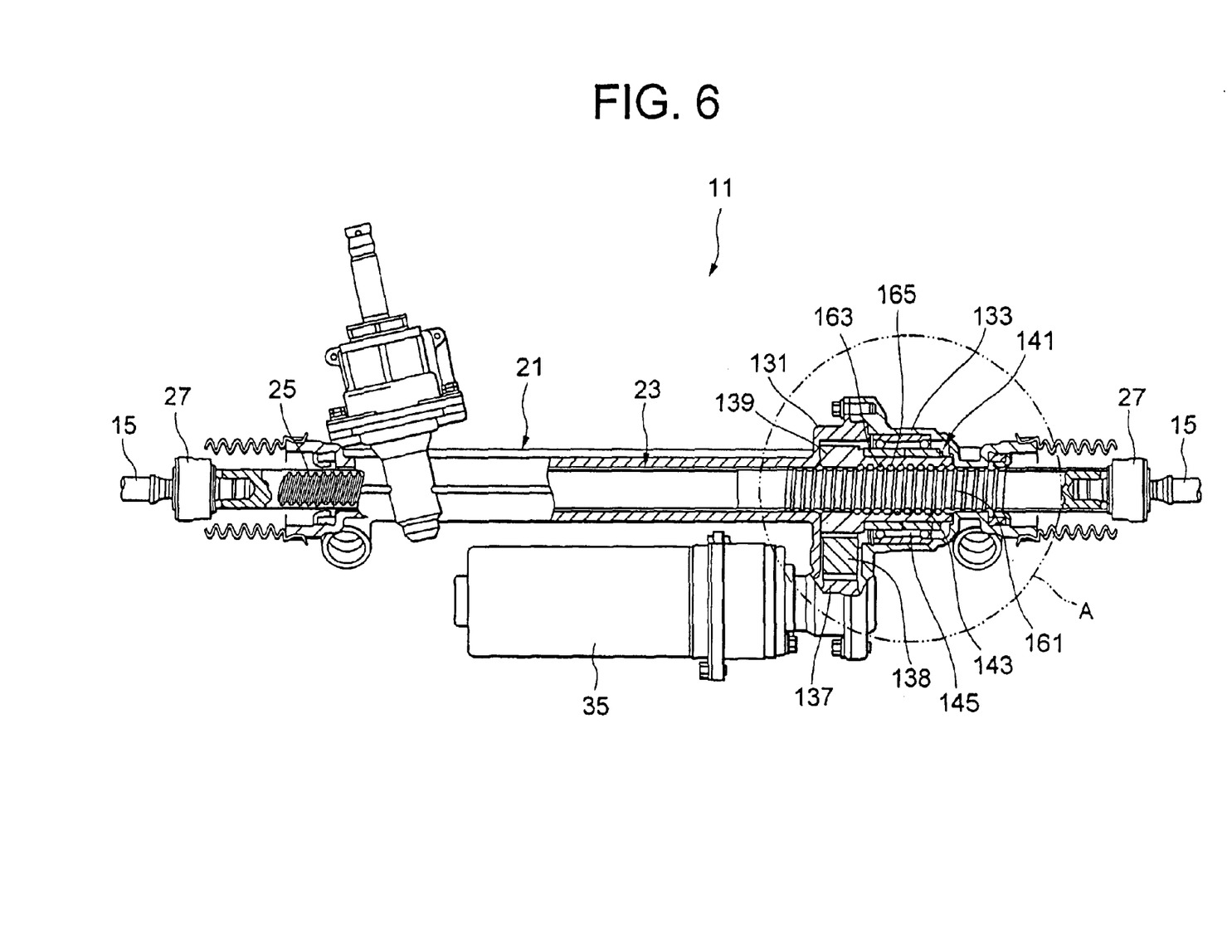
FIG. 6 is a front view showing the steering gear in a first embodiment of the second invention.

FIG. 6 is a front view showing a steering gear mechanism 11 in the first embodiment of the second invention. A member indicated by the numeral 21 in FIG. 6 is a rack-and-pinion housing configuring a steering gear case. The rack-and-pinion housing 21 accommodates a rack shaft 23 and a pinion (not shown) held therein, which constitute the rack-and-pinion mechanism. The rack shaft 23 has a rack 25 provided on the left in FIG. 6 and meshing with the pinion (not shown). Spherical joints 27, 27 supporting the tie rods 15, 15 are fixed to the right and left ends of the rack shaft 23.

The power assist mechanism has its shell configured by a gear housing 131 defined as a second housing formed at the left end of the rack-and-pinion housing 21, and by a ball screw housing 133 defined as a first housing fastened by bolts to the gear housing 131 and constituting the steering gear case in cooperation with the rack-and-pinion housing 21. The front end of the electric motor 35 is fastened by bolts to a lower portion of the gear housing 131.

A drive gear 137 fixed to a motor shaft (unillustrated) of the electric motor 35 and a driven gear 139 meshing with the drive gear 137 through an idle gear 138, are housed in between the gear housing 131 and the ball screw housing 133. Further, a ball nut 141 provided with the driven gear 139 at its end is rotatably held in the ball screw housing 133. The ball nut 141 is constructed of a ball nut body 143 and a double-row angular ball bearing 145 fitted on the ball nut body 143.

Figure 7:
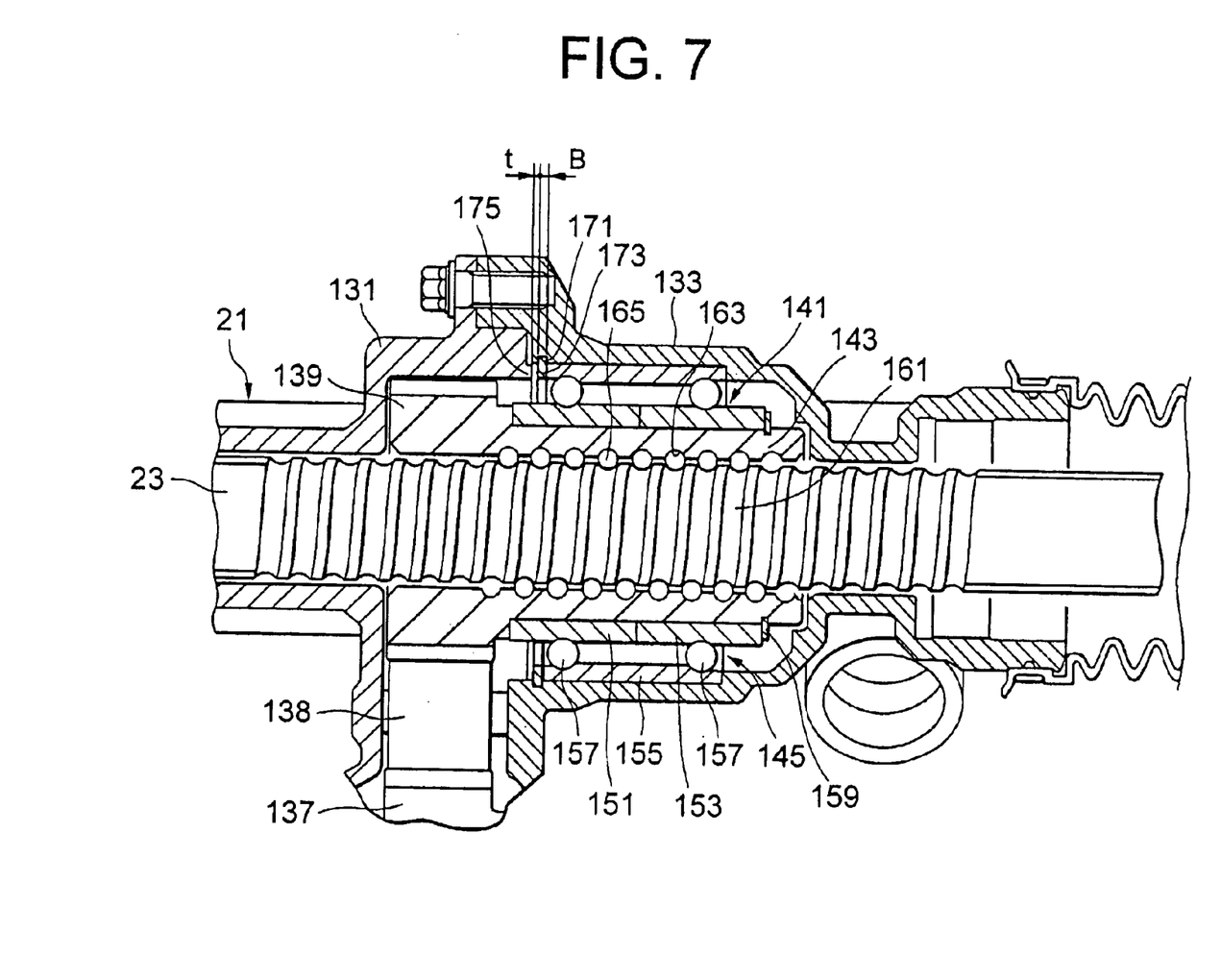
FIG. 7 is an enlarged sectional view showing a portion A in FIG. 6.

The double-row angular ball bearing 145 is structured such that steel balls 157 are interposed in two rows between a couple of inner races 151, 153 and an outer race 155, wherein the inner races 151, 153 are secured by a stopper ring 159 fitted on the ball nut body 143. With this structure, the ball nut body 143 is integrated with the double-row angular ball bearing 145.

The rack shaft 23 is formed with a male thread groove 161, while the ball nut body 143 is formed with a female thread groove 163. A number of steel balls 165 serving as the circulation balls are interposed between the male thread groove 161 and the female screw groove 163. Moreover, the ball nut body 143 is fitted with circulation pieces (not shown) for assisting the circulation of the steel balls 165.

According to the first embodiment of the second invention, the ball screw housing 133 has an annular groove 171 formed in along its inner peripheral surface on the side of the gear housing 131. An outer peripheral portion of a C-shaped stopper ring 173 fixedly engaging with the outer race 155 of the double-row angular ball bearing 145 is fitted in this annular groove 171. On the other hand, the gear housing 131 is provided with a fastening element contact member 175 protruding in a face-to-face relationship with the C-shaped stopper ring 173. Then, an interval t (between the fastening element contact member 175 and the left end surface, as viewed in the Figure, of the annular groove 171) between the fastening element contact member 175 and the C-shaped stopper ring 173, is set significantly smaller than a thickness B of the C-shaped stopper ring 173.

An operation of the first embodiment of the second invention will hereinafter be described.

On the occasion of assembling the steering gear mechanism 11, an assembler fits the ball nut 141 into the ball screw housing 133, and thereafter prevents a shift of the ball nut 141 by fitting the C-shaped stopper ring 173 into the annular groove 171.

Figure 8:
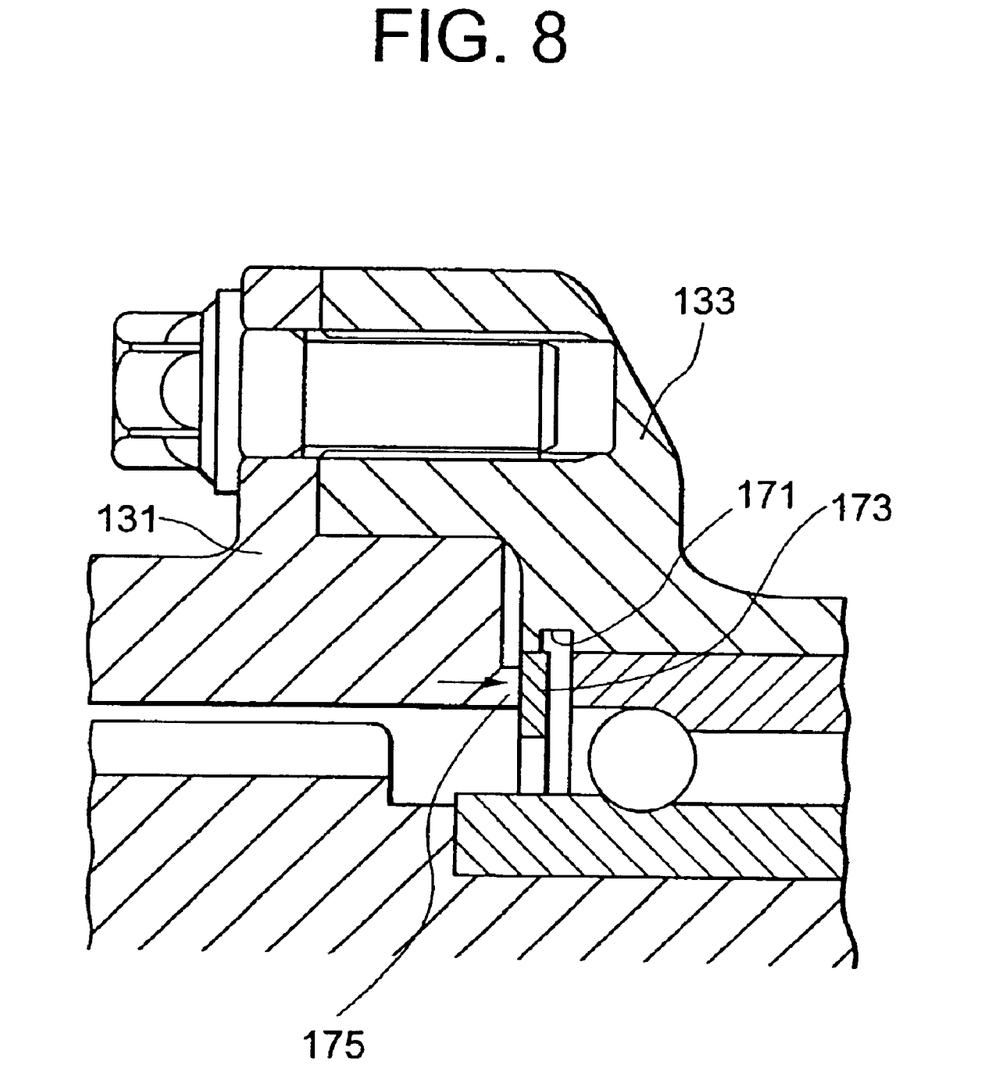
FIG. 8 is an explanatory view showing an operation in the first embodiment of the second invention.

According to the first embodiment of the second invention, the clearance t between the fastening element contact member 175 and the left end surface, as viewed in the Figure, of the annular groove 171 is set smaller then the width B of the C-shaped stopper ring 173, thereby preventing the C-shaped stopper ring 173 from falling out of the ball screw housing 133.

With this contrivance, according to the first embodiment of the second invention, even if unexpected load is applied to the nut and C-shaped stopper ring 173 comes off from the groove of housing, the ball bearing could not move in axial direction, and the steer function is secured.

Figure 9:
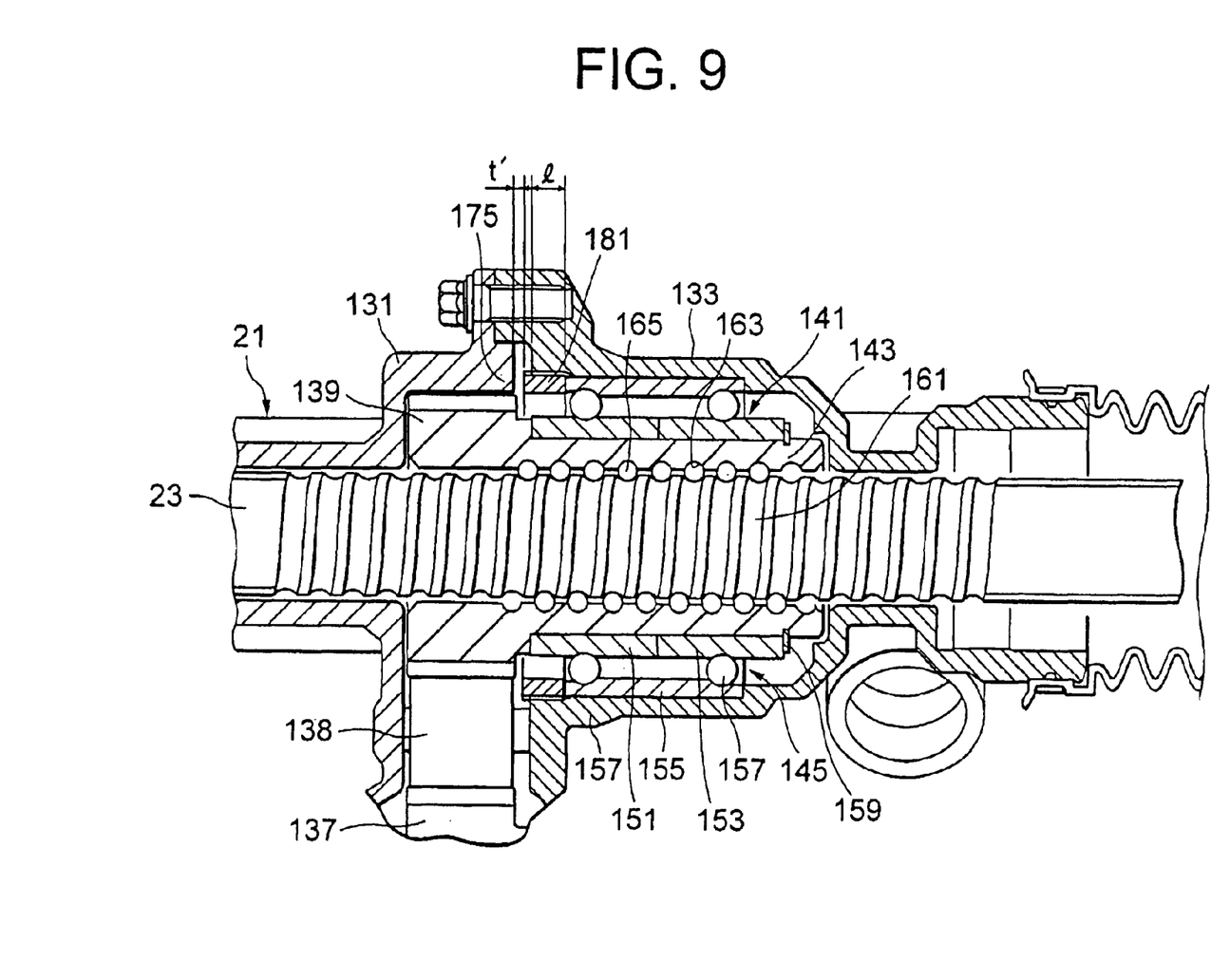
FIG. 9 is a sectional view showing the principal components of the steering gear in a second embodiment of the second invention.

FIG. 9 is a vertical sectional view showing principal portions of the steering gear mechanism 11 in a second embodiment of the second invention. The second embodiment of the second invention also adopts the same whole construction as in the first embodiment of the second invention, however, the ball nut 141 (the double-row angular ball bearing 145) is secured by a ring bolt 181. Then, an interval t' between the fastening element contact member 175 provided on the gear housing 31 and the ring bolt 181, is set significantly smaller than an effective helical fitting length l between the ring bolt 181 and the ball screw housing 133.

In the case of this second embodiment, the ring bolt 181, even when slackening due to vibrations etc during driving, does not fall out because of its end surface being contact-engaged with the fastening element contact member 175. Consequently, as in the first embodiment of the second invention, the quantity of axial shift of the ball nut 141 is regulated at the maximum t', with the result that the unagreeable feeling of the steering etc does not occur.

The specific embodiments, which have been discussed so far, comes to an end of their explanations, however, the mode of the second invention is not limited to the first and second embodiments described above. For instance, according to the embodiments discussed above, the rotations of the electric motor are transmitted via the gear to the ball nut and may also be transmitted thereto via a belt. Further, in the embodiments discussed above, the component of the ball nut involves the use of the double-row angular ball bearing, however, a double-row tapered roller bearing, a slide bearing etc may also be used. Moreover, the fastening element of the ball nut may involve the use of elements excluding the C-shaped stopper ring and the ring bolt, and the mechanism for preventing the fall-out of the fastening element may involve the use of members other than the fastening element contact member provided on the gear housing. Furthermore, the whole configuration of the steering gear and the structure of the power assist mechanism are not limited to the exemplifications in the embodiments discussed above, and can be, if within the range that does not deviate from the concept of the second invention, properly changed based on requests in terms of designs and specifications.

As discussed above, the electric power steering apparatus according to the second invention includes the ball nut rotationally driven by the electric motor and having a female thread groove formed in the inner periphery of the ball nut, the rack shaft disposed through the ball nut on the axis thereof and having a male thread groove so formed in its outer periphery as to face to the female thread groove, the plurality of circulation balls interposed between the female thread groove and the male thread groove, the housing for holding the ball nut rotatably, and the fastening element for fixing the nut to the housing. The thus constructed electric power steering apparatus is provided with the fall-out preventing mechanism for preventing the fastening element from falling out within the housing, and hence, even if the fastening element comes off and slackens, the ball nut does not move in excess of the predetermined range, whereby it is possible to actualize preventing the occurrence of the unagreeable feeling of the steering and so on.

Figure 10:
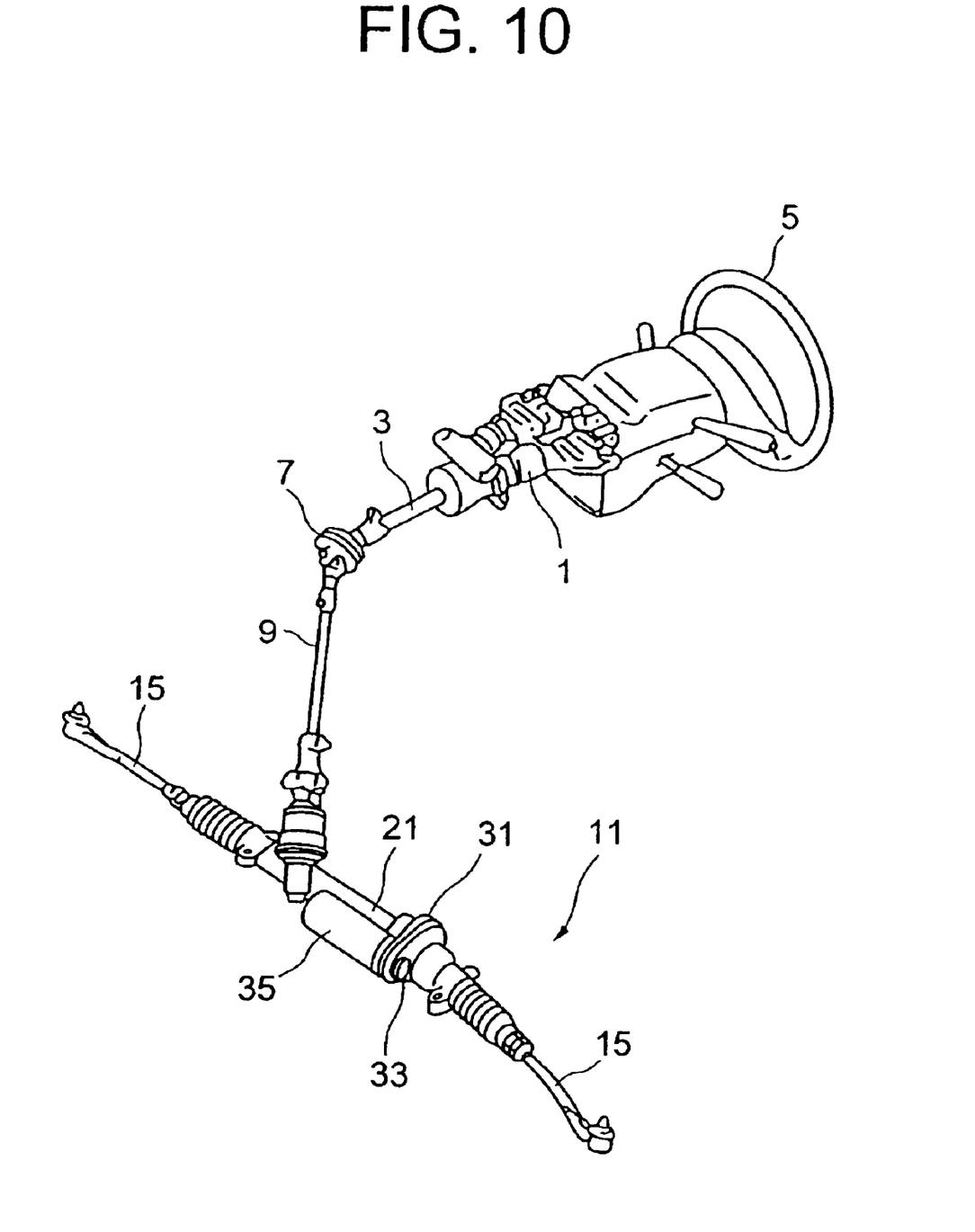
FIG. 10 is a perspective view showing an outline of construction of a steering apparatus in an embodiment of the third invention.

FIG. 10 is a perspective view showing an outline of configuration of a rack assist type electric power steering apparatus in an embodiment of the third invention. A member indicated by the numeral 1 in FIG. 10 is a steering column. The steering column 1 supports an upper steering shaft 3 rotatably. A steering wheel 5 is attached to an upper side end of the upper steering shaft 3. A lower steering shaft 9 is joined via a universal joint 7 to a lower side end of the shaft 3. A steering gear mechanism 11 constructed of a rack-and-pinion mechanism, a power assist mechanism etc is connected to a lower side end of the lower steering shaft 9. Referring again to FIG. 10, the numerals 15, 15 represent tie rods connected to right and left ends of the steering gear mechanism 11.

Figure 11:
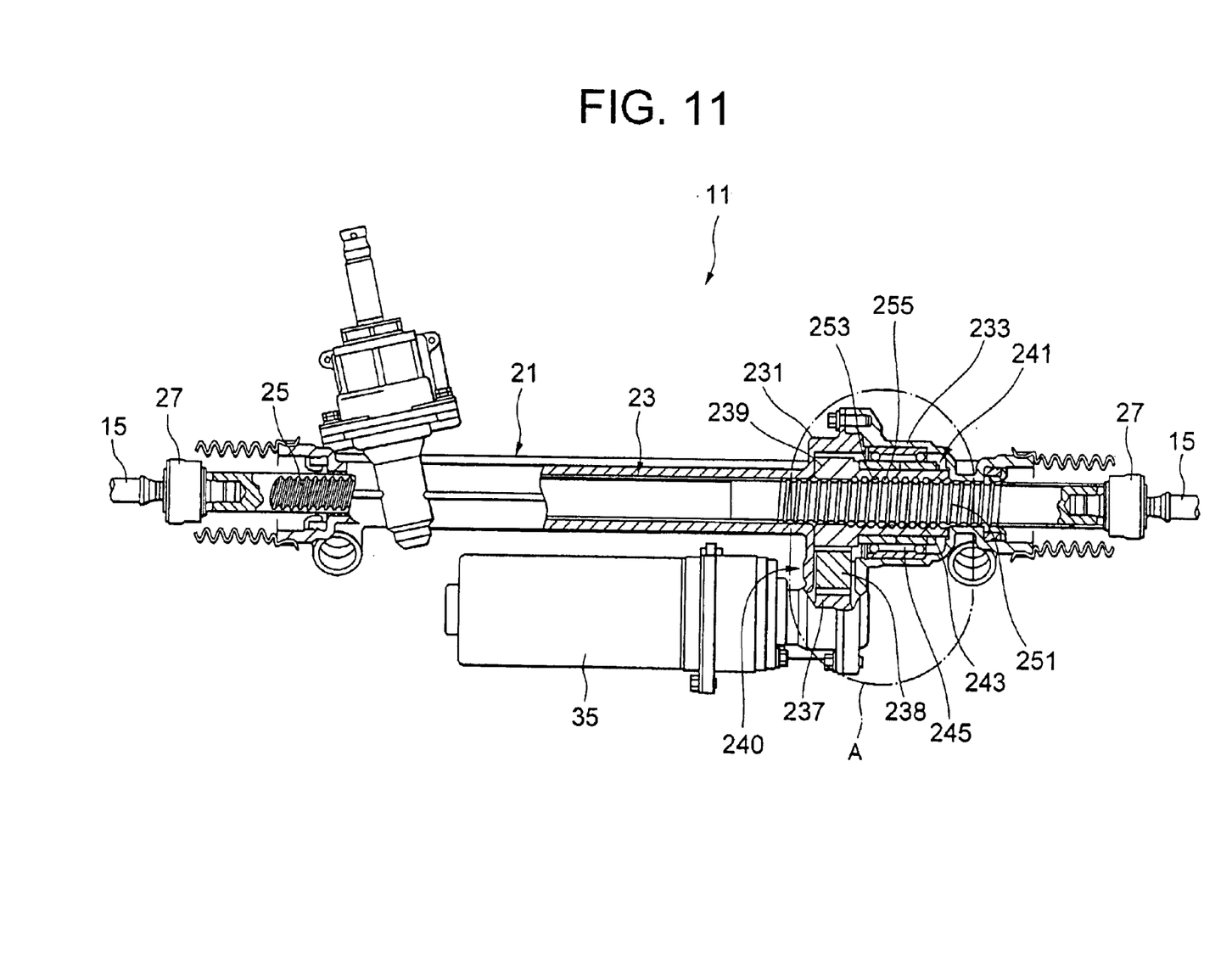
FIG. 11 is a vertical front view showing the principal components of the steering gear in this embodiment.
Figure 12:
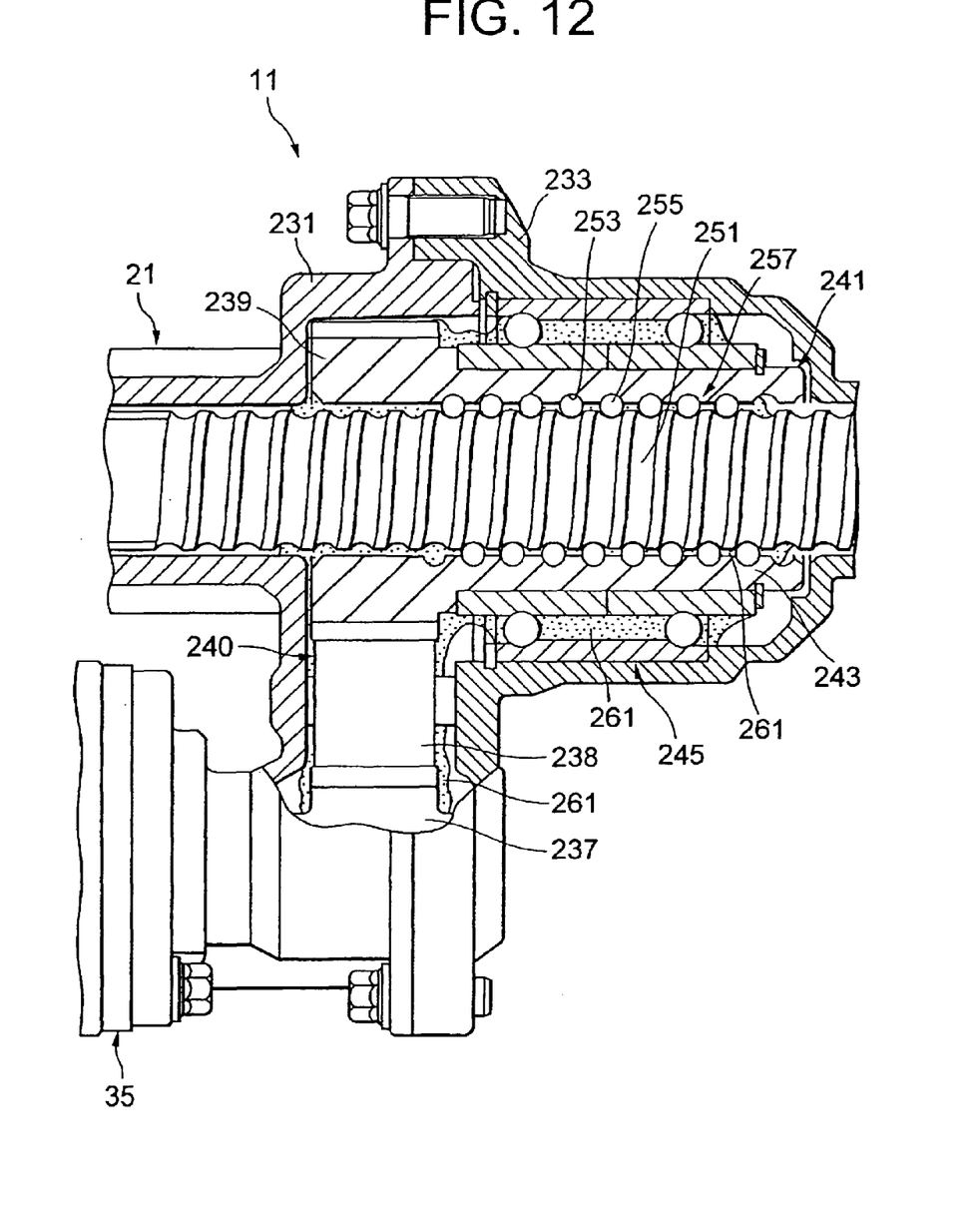
FIG. 12 is an enlarged view showing a portion A in FIG. 11.

FIG. 11 is a vertical plan view showing principal components of the steering gear mechanism 11 in this embodiment. FIG. 12 is an enlarged view showing a portion A in FIG. 11. A member indicated by the numeral 21 in these Figures is a rack-and-pinion housing configuring a steering gear case. The rack-and-pinion housing 21 accommodates a rack shaft 23 and a pinion (not shown) held therein, which constitute the rack-and-pinion mechanism. The rack shaft 23 has a rack 25 provided on the left as viewed in the Figures and meshing with the pinion (not shown). Spherical joints 27, 27 supporting the tie rods 15, 15 are fixed to the right and left ends of the rack shaft 23.

The power assist mechanism has its shell configured by a gear housing 231 defined as a second housing formed at the right end, as viewed in FIG. 11, of the rack-and-pinion housing 21, and by a ball screw housing 233 defined as a first housing fastened by bolts to the gear housing 231 and constituting the steering gear case in cooperation with the rack-and-pinion housing 21. As shown in FIG. 10, an electric motor 35 is fastened by bolts to the front portion of the gear housing 231. Note that the electric motor 35 is depicted downward for the explanatory convenience in FIG. 11.

A drive gear 237 fixed to a motor shaft (unillustrated) of the electric motor 35 and a driven gear 239 meshing with the drive gear 237 through an idle gear 238, are provided between the gear housing 231 and the ball screw housing 233. These gears 237, 238, 239 constitute a gear train 240 serving as a gear type power transmission mechanism.

A ball nut 241 having its end portion provided with the driven gear 239 is rotatably held in the ball screw housing 233. The ball nut 241 is constructed of a ball nut body 243 and a double-row angular ball bearing 245 fitted on the ball nut body 243.

The rack shaft 23 is formed with a male thread groove 251, while the ball nut body 243 is formed with a female thread groove 253, and a multiplicity of steel balls 525 defined as circulation balls are interposed between the male thread groove 521 and the female thread groove 253. A ball screw mechanism 257 is constructed of these components. Moreover, the ball nut body 243 is fitted with circulation pieces (not shown) for assisting the circulation of the steel balls 255.

As illustrated in FIG. 12, an air space encompassed by the gear housing 231 and the ball screw housing 233 is filled with lithium soap grease (which will hereinafter simply be called a grease) 261 as a lubricant. In this embodiment of the third invention, the grease 261 fills or is exchanged when assembling the steering gear 11 or disassembling this gear 11 for maintenance, and serves for lubrications between the gear train 240, the ball screw mechanism 257 and the double-row angular ball bearing 245.

This embodiment of the third invention does not use the shaft seal for preventing a mixture of the grease in the conventional apparatus, and hence a friction loss caused by the rotations of the ball nut 241 decreases, thereby enhancing the feeling of the steering. Further, neither the gear housing 231, nor the ball screw housing 233 nor the ball nut 241 needs working a seal seat or seal slide surface for the shaft seal, whereby the costs for the product remarkably decreases along with no use of the shaft seal.

The specific embodiment of the third invention, which has been discussed so far, comes to an end of its explanation, however, the mode of the third invention is not limited to the embodiment described above. For example, in the embodiment discussed above, what has been exemplified as the power transmission mechanism is the gear type power transmission mechanism including the single idle gear, however, a chain type power transmission mechanism or a belt type power transmission mechanism or a friction roller type power transmission mechanism may also be adopted, and there can be also applied a so-called coaxial type power transmission mechanism in which the ball nut is integrated with the rotor of the electric motor. Further, the double-row angular ball bearing has been exemplified as the bearing, however, other types of bearing may also be used. Further, solid-state lubricants and greases other than lithium soap grease are, if capable of meeting the conditions such as a lubricating performance, a durability etc, usable as the lubricant. For others, the whole configuration of the steering gear, the structure of the power assist mechanism and so on can be, if within the range that does not deviate from the concept of the third invention, properly changed based on requests in terms of designs and specifications.

As discussed above, according to the third invention, the rack assist type electric power steering apparatus includes the ball nut rotationally driven by the electric motor, the ball screw mechanism interposed between the ball nut and the rack shaft, and the bearing for rotatably supporting the ball nut. In the thus constructed electric power steering apparatus, the ball screw mechanism shares the lubricant with the bearing, which eliminates the necessity for the shaft seal, and so on. Owing to the above-mentioned, the friction loss caused by the rotations of the ball nut decreases, and the enhanced feeling of the steering is attained. Besides, the decreases in the number of working processes for the steering gear case etc and in the number of components, lead to the considerable reduction in the costs for the product.

What is claimed is:

1. An electric power steering apparatus comprising:
   a ball nut rotationally driven by an electric motor through a gear train and having a female thread groove formed in the inner periphery thereof;
   a rack shaft disposed through said ball nut on the axis thereof and having a male thread groove so formed in its outer periphery as to face to the female thread groove;
   a ball screw mechanism having a number of circulation balls interposed between the female thread groove and the male thread groove; and
   a housing holding said ball nut rotatably through a bearing,
   wherein elastic members are interposed between said housing and said ball nut in order to permit said ball nut to make a predetermined displacement, and
   wherein said elastic members include a first elastic member and a second elastic member respectively interposed between opposite ends of a race of said bearing and respective abutment surfaces.

2. An electric power steering apparatus according to claim 1, wherein said elastic members provide a bias to the ball nut, so as to absorb backlash.

3. An electric power steering apparatus according to claim 1, wherein said race is an inner race of said bearing.

4. An electric power steering apparatus according to claim 3, wherein one of said abutment surfaces is defined by a stepped portion of said ball nut.

5. An electric power steering apparatus according to claim 3, wherein one of said abutment surfaces is defined by a stopper member mounted to said ball nut.

6. An electric power steering apparatus according to claim 1, wherein said race is an outer race of said bearing.

7. An electric power steering apparatus according to claim 6, wherein said abutment surfaces is defined by a stepped portion of said housing.

8. An electric power steering apparatus according to claim 6, wherein one of said abutment surfaces is defined by a stopper member mounted to said housing.

9. An electric power steering apparatus according to claim 1, wherein said elastic members include first and second elastic flange portions of an elastic bush having a cylindrical portion connecting said flange portions.

10. An electric power steering apparatus according to claim 9, wherein said cylindrical portion is interposed radially between an inner race of said bearing and a radially outer peripheral surface of said ball nut.

11. An electric power steering apparatus according to claim 9, wherein said race of said bearing is received in a recessed portion of said bush between said first and second elastic flange portions.

12. An electric power steering apparatus according to claim 11, wherein said race is an inner race of said bearing.

13. An electric power steering apparatus according to claim 9, wherein said elastic members provide a bias to the ball nut, so as absorb backlash.

14. An electric power steering apparatus according to claim 9, wherein said cylindrical portion is interposed radially between an outer race of said bearing and an inner surface of said housing.

15. An electric power steering apparatus according to claim 11, wherein said race is an outer race of said bearing.

* * * * *